(12) United States Patent
Kanenari et al.

(10) Patent No.: US 8,939,181 B2
(45) Date of Patent: Jan. 27, 2015

(54) METHOD AND KIT FOR RECOVERING PUNCTURE REPAIR LIQUID

(75) Inventors: Daisuke Kanenari, Hiratsuka (JP); Takahiro Okamatsu, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 116 days.

(21) Appl. No.: 13/521,180

(22) PCT Filed: Nov. 19, 2010

(86) PCT No.: PCT/JP2010/070671
§ 371 (c)(1),
(2), (4) Date: Jul. 9, 2012

(87) PCT Pub. No.: WO2011/086763
PCT Pub. Date: Jul. 21, 2011

(65) Prior Publication Data
US 2013/0037167 A1    Feb. 14, 2013

(30) Foreign Application Priority Data
Jan. 15, 2010 (JP) ................ 2010-006701

(51) Int. Cl.
*B65B 3/16* (2006.01)
*B29C 73/02* (2006.01)
*B29C 73/16* (2006.01)
*B29C 73/22* (2006.01)
*B29L 30/00* (2006.01)

(52) U.S. Cl.
CPC ............ *B29C 73/02* (2013.01); *B29C 73/166* (2013.01); *B29C 73/22* (2013.01); *B29L 2030/00* (2013.01)
USPC ............ 141/114; 141/65; 383/22; 383/42; 383/61.2; 383/109

(58) Field of Classification Search
USPC ........ 141/114, 113, 8, 38, 65, 66; 383/33, 42, 383/61.2, 109, 113
See application file for complete search history.

(56) References Cited

U.S. PATENT DOCUMENTS 4,700,531 A * 10/1987 Hsu et al. ................. 53/412
5,927,348 A * 7/1999 Gerresheim et al. ............ 141/65
(Continued)

FOREIGN PATENT DOCUMENTS

| EP | 2 213 446 A1 | 10/2008 |
| JP | 10-067212 A | 3/1998 |
| JP | 2003-26217 A | 1/2003 |
| JP | 2003-127242 A | 5/2003 |
| JP | 2007-331210 A | 12/2007 |

(Continued)

OTHER PUBLICATIONS

International Search Report of corresponding International Application No. PCT/JP2010/070671, dated on Feb. 1, 2011.

*Primary Examiner* — Jason K Niesz
(74) *Attorney, Agent, or Firm* — Global IP Counselors, LLP

(57) ABSTRACT

Provided are a method and a kit for recovering puncture repair liquid, which have made it possible to easily and quickly dispose of spent puncture repair liquid. The method for recovering puncture repair liquid according to the present invention uses a kit for recovering the puncture repair liquid which is provided with a coagulant for coagulating the puncture repair liquid and a flexible bag containing the puncture repair liquid, and includes injecting the puncture repair liquid drawn from the inside of a tire into the bag, mixing the puncture repair liquid and the coagulant in the bag, and recovering the puncture repair liquid in a coagulated state.

2 Claims, 2 Drawing Sheets

(56) References Cited

U.S. PATENT DOCUMENTS

| | | | |
|---|---|---|---|
| 6,332,711 B1 * | 12/2001 | Inuzuka et al. | 383/9 |
| 7,658,543 B2 * | 2/2010 | Shiokawa et al. | 383/107 |
| 2003/0024596 A1 | 2/2003 | Kojima et al. | |
| 2008/0089618 A1 * | 4/2008 | Blythe | 383/25 |

FOREIGN PATENT DOCUMENTS

| | | |
|---|---|---|
| JP | 2009-041006 A | 2/2009 |
| JP | 2009-090574 A | 4/2009 |
| JP | 2009-090862 A | 4/2009 |
| JP | 2010-683 A | 1/2010 |

* cited by examiner

METHOD AND KIT FOR RECOVERING PUNCTURE REPAIR LIQUID

CROSS-REFERENCE TO RELATED APPLICATIONS

This U.S. National stage application claims priority under 35 U.S.C. §119(a) to Japanese Patent Application No. 2010-006701, filed in japan on Jan. 15, 2010, the entire contents of Japanese Patent Application No. 2010-006701 are hereby incorporated herein by reference.

BACKGROUND

1. Field of the Invention

The present invention relates to a method and a kit for recovering puncture repair liquid, and more specifically relates to a method and a kit for recovering puncture repair liquid making it possible to dispose of spent puncture repair liquid easily and quickly.

2. Background Information

In recent years, when a tire attached to a vehicle has a puncture, puncture repair liquid is injected into the tire via a tire valve to thereby repair the puncture on an emergency basis and at the same time to fill the tire with air.

The method for repairing a puncture as described above, however, has the following problem. Specifically, the puncture repair liquid remains in the tire. Thus, when the tire is detached from a wheel to be replaced with a new one, the puncture repair liquid overflowed from the tire is smeared on equipment such as a tire changer. As countermeasures for the problem, various methods are proposed in which puncture repair liquid is drawn from the inside of a tire through a tire valve of a wheel or an attachment hole thereof, and then the puncture repair liquid is recovered into a bottle Examples of such methods are described in Japanese patent application Kokai publication No. 2003-127242, Japanese patent application Kokai publication No. Hei 10-67212 and Japanese patent application Kokai publication No. 2007- 331210.

However, the puncture repair liquid recovered into the bottle must not be drained into a sewer without any treatment, thus requiring some treatment thereon. For example, suppose a case of a puncture repair shop. In this case, it is conceivable that recovered puncture repair liquid is accumulated and then delivered to a waste disposal company after the puncture repair liquid is accumulated in a certain amount, and so on. However, in general, a large volume of the puncture repair liquid is not recovered in a short period. For this reason, there is a demand for making the puncture repair liquid disposable easily and quickly after the recovery thereof.

Meanwhile, a method has been proposed in Japanese patent application Kokai publication No. 2009-41006 in which an emulsion coagulant is injected into a tire having a puncture repair liquid remaining therein, thereby the puncture repair liquid is solidified, and the solidified puncture repair liquid is disposed of after the tire is detached from a wheel. However, this case exhibits a disadvantage that the emulsion coagulant is difficult to inject into the tire which is already attached to the wheel, and thus is not necessarily practical.

SUMMARY

An object of the present invention is to provide a method and a kit for recovering puncture repair liquid making it possible to easily and quickly dispose of spent puncture repair liquid.

A method for recovering puncture repair liquid in which a recovery kit is used, the recovery kit including a coagulant for coagulating puncture repair liquid and a flexible bag for receiving and containing the puncture repair liquid, according to the present invention for achieving the object is characterized in that the method includes: injecting the puncture repair liquid drawn from the inside of a tire into the bag; mixing the puncture repair liquid and the coagulant together in the bag; and recovering the puncture repair liquid in a coagulated state.

A kit for recovering puncture repair liquid according to the present invention for achieving the object is characterized in that the kit for recovering puncture repair liquid incldues: a coagulant for coagulating puncture repair liquid; and a flexible bag for containing the puncture repair liquid.

According to the present invention, the recovery kit including the coagulant for the puncture repair liquid and the flexible bag is used, the puncture repair liquid drawn from the tire is injected into the bag, the puncture repair liquid and the coagulant are mixed together in the bag, and the puncture repair liquid is recovered in the coagulated state. Thus, the spent puncture repair liquid can be disposed of as burnable waste easily and quickly.

In the present invention, it is preferable that the flexible bag include a seal zone in an opening portion thereof. In this case, after the puncture repair liquid is injected into the flexible bag, the opening portion of the bag is sealed easily by the seal zone, and the bag is knead in the sealed state. Thereby, the puncture repair liquid and the coagulant can be mixed together in the bag. Thus, it is possible to reliably prevent the puncture repair liquid from overflowing during kneading the bag.

It is preferable that the flexible bag be formed by a laminated film including an intermediate layer, an inner layer, and an outer layer and have the coagulant enclosed in the bag in advance, the intermediate layer having a gas barrier property, the inner layer and the outer layer being respectively laminated on the both sides of the intermediate layer. Since the laminated film includes the intermediate layer having the gas barrier property, the enclosed coagulant is not exposed to air, and the quality thereof can be maintained for a long time. Trouble of putting the coagulant in the flexible bag separately can also be avoided, as a matter of course.

It is preferable that the flexible bag have a gusset in a lower portion thereof to have a self-standing structure. In this case, there is no need to support the bag when the puncture repair liquid is drawn from the inside of the tire. Thus, even if an operation of a valve or the like is required at the time of drawing the puncture repair liquid from the inside of the tire, all the recovery operations can be performed by one operator alone.

DETAILED DESCRIPTION OF EMBODIMENTS

Figure 1:
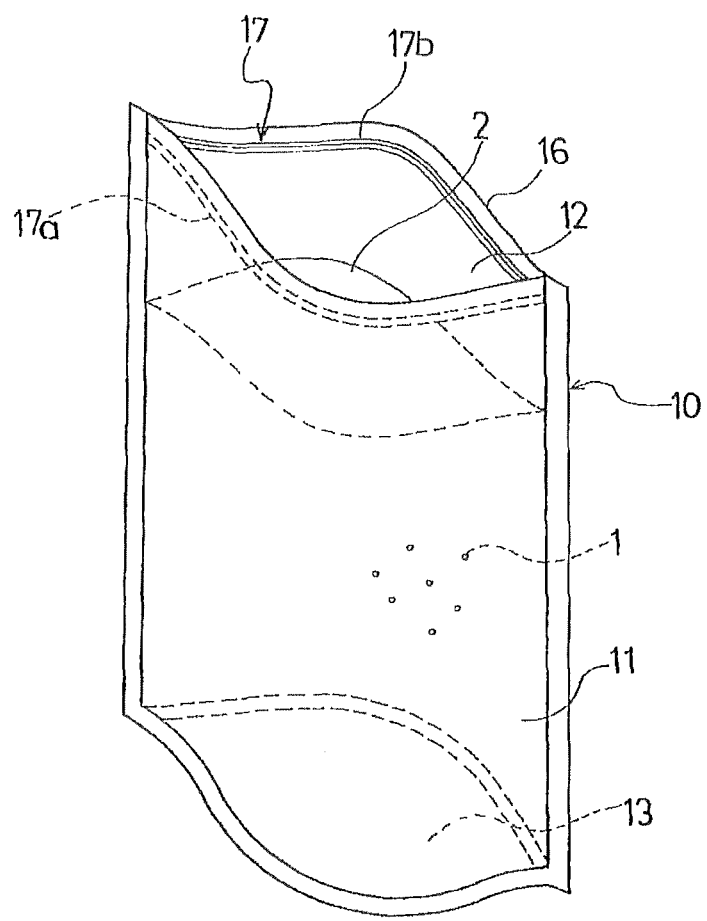
FIG. 1 is a perspective view showing a kit for recovering puncture repair liquid according to an embodiment of the present invention in a used state with its part cut away.
Figure 2:
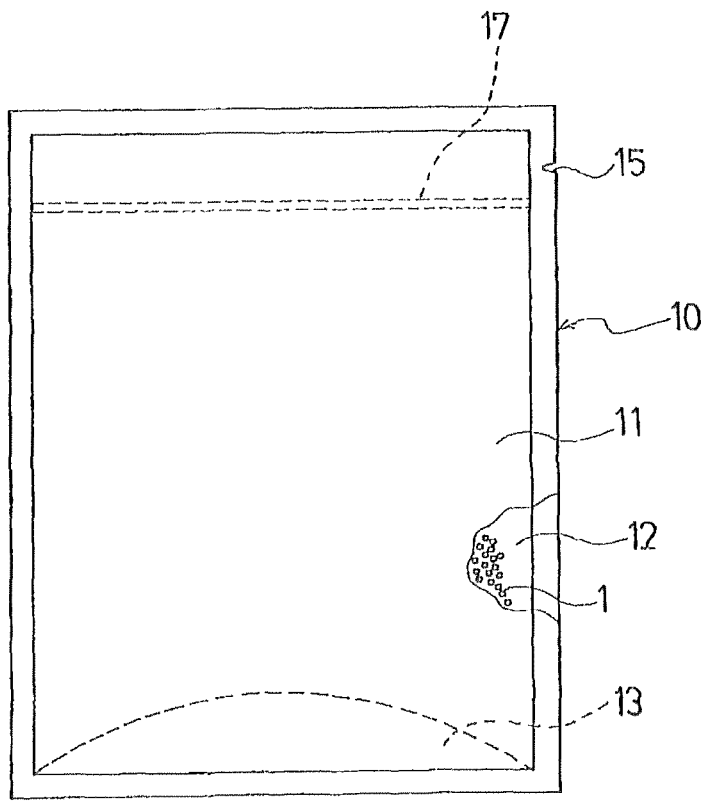
FIG. 2 is a side view showing an unused state of the kit for recovering puncture repair liquid in FIG. 1.

A configuration of the present invention will be described below in detail by referring to the attached drawings. FIGS. 1 to 3 show a kit for recovering puncture repair liquid according to an embodiment of the present invention. As shown in FIG. 1, the kit for recovering puncture repair liquid in this embodiment includes a coagulant 1 for coagulating puncture repair liquid and a flexible bag 10 for containing the puncture repair liquid.

The coagulant 1 is not particularly limited, as long as the coagulant 1 coagulates puncture repair liquid containing emulsion particles. For example, a coagulant described in Japanese patent application Kokai publication No. 2009-41006 can be used. The coagulant contains a gelation agent and a mineral which induces aggregation of the emulsion particles.

As the mineral, at least one mineral selected from the group consisting of silicate, oxide, and carbonate can be used. For example, at least one mineral selected from the group consisting of alumina, sodium silicate, magnesium silicate, aluminum silicate, montmorillonite, bentonite, and zeolite may be used.

In contrast, as the gelation agent, at least one gelation agent selected from the group consisting of polyethylene oxide, polypropylene oxide, hydroxyethyl cellulose, degeneration polymers thereof, sodium alginate, propylene glycol alginate, and dibenzylidene sorbitol may be used.

An amount of the gelation agent may be 20 to 700 parts by weight, and may be preferably 60 to 200 parts by weight with respect to a mineral of 100 parts by weight. However, the coagulant can contain an additive as necessary in addition to the mineral and the gelation agent. Examples of the additive include a filler, an age resistor, an antioxidant, a pigment (a dye), a plasticizer, a thyxotropic agent, an ultraviolet absorber, a flame retardant, a surfactant, a dispersant, a dehydrator, and an antistatic agent.

Meanwhile, the flexible bag 10 is formed by heat sealing two side sheets 11 and 12 and a single gusset 13 which are each formed by a laminated film 14. The bag 10 has the coagulant 40 enclosed therein in advance. The bag 10 desirably has a capacity of 700 ml to 2000 ml to receive and contain the puncture repair liquid recovered from the inside of the tire. The gusset 13 is provided to a lower portion of the bag 10. The gusset 13 is folded before the bag 10 is used, but may always be opened. Anyhow, the bag 10 is configured to stand while having a solid shape with the gusset 13 opened.

Figure 3:
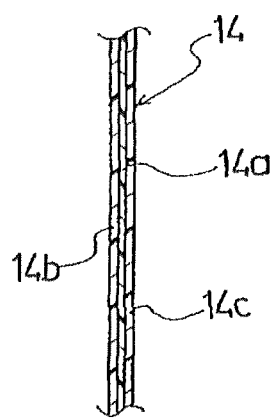
FIG. 3 is an enlarged cross-sectional view showing a laminated film forming a flexible bag of the kit for recovering puncture repair liquid in FIG. 1.

As shown in FIG. 3, the laminated film 14 includes: an intermediate layer 14a having a gas barrier property; an inner layer 14b laminated on an inner side of the intermediate layer 14a; and an outer layer 14c laminated on an outer side of the intermediate layer 14a. As a material forming the intermediate layer 14a, a synthesis resin having low gas permeability such as an ethylene-vinylalcohol copolymer (EVOH), polyamide (PA), polyvinylidene chloride (PVDC), polyvinyl alcohol (PVA), MX nylon (MXD6) or a polyacrylonitride resin (PAN), and a metal foil such as an aluminum foil can be used. In contrast, as materials of the inner layer 14b and the outer layer 14c, synthesis resins such as polyethylene, polyester, and nylon can be used to ensure the mechanical strength and a weathering. The inner layer 14b and the outer layer 14c are preferably made of the same material, but may be made of materials different from each other according to required characteristics.

The thickness of the intermediate layer 14a may be set at 5 µm to 200 µm in the case of the synthesis resin. In the case of the metal foil such as the aluminum foil, the thickness may be set at 1 nm to 500 nm and preferably 5 nm to 200 nm. A too thin thickness of the intermediate layer 14a causes deterioration of the gas barrier property. On the contrary, a too thick thickness thereof causes deterioration of the flexibility. In addition, the thicknesses of the inner layer 14b and the outer layer 14c may be set at 5 µm to 100 µm. Too thin thicknesses of the inner layer 14b and the outer layer 14c deteriorate a durability in mixing the puncture repair liquid and the coagulant together. On the contrary, too thick thicknesses deteriorate the flexibility.

Note that the inner layer 14b and the outer layer 14c may each be a single layer or may be a multi-layer made of different materials. In the case of the multi-layer, a total thickness thereof may be set at 5 µm to 100 µm.

A tear notch 15 is provided in an upper portion in a side edge of the bag 10. The bag 10 is designed such that an opening portion 16 (see FIG. 1) is formed by tearing off an upper end portion of the bag 10 from the tear notch 15 (see FIG. 3) which is a tear start point. In addition, the bag 10 is provided with a seal zone 17 along the opening portion 16. A structure of the seal zone 17 is not particularly limited, as long as the opening portion 16 can be sealed. For example, the seal zone 17 can include a concave groove 17a and a convex groove 17b, the concave groove 17a extending along the opening portion 16 in the one side sheet 11, the convex groove 17b extending along the opening portion 16 in the other side sheet 12 and being elastically fitted in the concave groove 17a.

Next, a description is given of a method for recovering puncture repair liquid by using the aforementioned kit for recovering puncture repair liquid. As shown in FIG. 1, an upper end of the bag 10 containing the coagulant 1 is firstly opened, and puncture repair liquid 2 drawn from the inside of the tire is injected thereinto. Subsequently, the opening portion 16 of the bag 10 is sealed by the seal zone 17, and then the puncture repair liquid 2 and the coagulant 1 are mixed together by kneading the flexible bag 10 to thereby coagulate the puncture repair liquid 2 in the bag 10. As the result, the spent puncture repair liquid 2 can be disposed of together with the bag 10 as burnable waste easily and quickly.

In the aforementioned method for recovering puncture repair liquid, since the seal zone 17 is provided along the opening portion 16 of the flexible bag 10, it is possible to reliably prevent the puncture repair liquid 2 from overflowing during kneading the bag 10.

Moreover, the flexible bag 10 is formed by the laminated film 14 the intermediate layer 14a having the gas barrier property, and the bag 10 has the coagulant 1 enclosed therein in advance. Thus, the enclosed coagulant 1 is not exposed to air, and the quality thereof can be maintained for a long time.

Further, since the bag 10 has the gusset 13 in the lower portion to have a self-standing structure, there is no need to support the bag 10 when the puncture repair liquid 2 is drawn from the inside of the tire. This provides an advantage that all the recovery operations can be performed by a one operator alone even if an operation of a valve or the like is required at the time of drawing the puncture repair liquid 4 from the inside of the tire 1.

In the aforementioned embodiments, the descriptions have been given for the case where the flexible bag is formed by a laminated film including the intermediate layer having the gas barrier property and where the coagulant is enclosed in the bag in advance. However, in the present invention, a soft plastic bag or the like maybe used as the flexible bag, and the coagulant may be enclosed in another package having the gas barrier property. In this case, the coagulant may be injected into the flexible bag together with the puncture repair liquid to mix the puncture repair liquid and the coagulant together.

The preferable embodiments of the present invention have been described in detail, but it shall be understood that the preferred embodiments can be variously modified, substituted, and replaced without departing from the spirit or scope of the present invention as defined by the appended scope of claims.

The invention claimed is:

1. A method for recovering puncture repair liquid in which a recovery kit is used, the recovery kit comprising a coagulant to coagulate puncture repair liquid and a flexible bag configured to receive and contain the puncture repair liquid, the method comprising:

standing the flexible bag in a self-standing manner on a gusset in a lower portion of the flexible bag that provides the flexible bag with a self-standing structure;

injecting the puncture repair liquid drawn from the inside of a tire into the flexible bag while the flexible bag is standing on the gusset in the self-standing manner, the flexible bag comprising a seal zone in an opening portion thereof;

after injecting the puncture repair liquid into the flexible bag, sealing the flexible bag by the seal zone;

kneading the flexible bag in its sealed state to mix the puncture repair liquid and the coagulant together in the flexible bag such that the mixing mixes the puncture repair liquid and the coagulant together in the flexible bag with the opening portion of the flexible bag sealed by the seal zone; and recovering the puncture repair liquid in a coagulated state after the mixing.

2. The method for recovering puncture repair liquid according to claim 1, further comprising forming the flexible bag by a laminated film including an intermediate layer, an inner layer, and an outer layer, the intermediate layer having a gas barrier property, the inner layer and the outer layer being respectively laminated on the both sides of the intermediate layer, and enclosing the coagulant in the flexible bag in advance of performing the injecting.

* * * * *